(12) United States Patent
Snoswell (10) Patent No.: US 12,473,846 B2
(45) Date of Patent: Nov. 18, 2025

(54) SYSTEMS AND METHODS FOR OXY-COMBUSTION

(71) Applicant: Schlumberger Technology Corporation, Sugar Land, TX (US)

(72) Inventor: David Snoswell, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 11 days.

(21) Appl. No.: 18/414,678

(22) Filed: Jan. 17, 2024

(65) Prior Publication Data
US 2024/0240339 A1 Jul. 18, 2024

Related U.S. Application Data

(60) Provisional application No. 63/480,112, filed on Jan. 17, 2023.

(51) Int. Cl.
| | |
|---|---|
| *F01K 25/00* | (2006.01) |
| *C25B 1/042* | (2021.01) |
| *C25B 15/08* | (2006.01) |
| *F22B 1/00* | (2006.01) |
| *F23L 7/00* | (2006.01) |

(52) U.S. Cl.
CPC ............ *F01K 25/005* (2013.01); *C25B 1/042* (2021.01); *C25B 15/081* (2021.01); *F22B 1/003* (2013.01); *F23L 7/005* (2013.01); *F23L 7/007* (2013.01)

(58) Field of Classification Search
CPC ........... C25B 1/04; C25B 1/042; C25B 15/02; C25B 15/021; C25B 15/027; C25B 15/081; F01K 25/005; F22B 1/003; F23L 7/005

USPC .......................... 204/239; 205/349, 412, 628
See application file for complete search history.

(56) References Cited

U.S. PATENT DOCUMENTS

| | | | |
|---|---|---|---|
| 3,459,953 A | * | 8/1969 | Brauser ................ F01K 25/005 290/52 |
| 5,177,952 A | | 1/1993 | Stone |
| 8,048,276 B2 | | 11/2011 | Balestrino et al. |

(Continued)

FOREIGN PATENT DOCUMENTS

| | | |
|---|---|---|
| CN | 101346494 A | 1/2009 |
| DE | 102010035487 A1 | 2/2012 |

(Continued)

OTHER PUBLICATIONS

Von Scheele, J., "Embracing Hydrogen Flameless Oxyfuel for CO2-free heating", Oct.-Nov. 2020, pp. 12-14.
Genvia, www.genvia.com-steel, pp. 1-3.

*Primary Examiner* — Luan V Van
*Assistant Examiner* — Alexander R. Parent
(74) *Attorney, Agent, or Firm* — Jeffrey D. Frantz (57) ABSTRACT

A method of oxy-combustion includes providing an electrolyzer feedstock to at least an electrolyzer cell; separating the electrolyzer feedstock into a hydrogen feedstock and an oxygen feedstock using the at least one electrolyzer cell; combusting a first feedstock derived from the hydrogen feedstock and a second feedstock derived from the oxygen feedstock in a furnace; controlling one or more of a second feedstock composition or a pressure in the furnace; and recycling an exhaust steam from the furnace, wherein at least one portion of exhaust steam from the furnace is recycled in at least one of a steam feedstock and the electrolyzer feedstock.

20 Claims, 6 Drawing Sheets

(56) References Cited

U.S. PATENT DOCUMENTS

| | | | |
|---|---|---|---|
| 8,366,902 B2 * | 2/2013 | Hawkes | C25B 1/04 |
| | | | 205/628 |
| 11,542,839 B2 | 1/2023 | Ruiz | |
| 2018/0287179 A1 * | 10/2018 | Rueger | C25B 15/02 |
| 2019/0264582 A1 | 8/2019 | Hinders et al. | |
| 2022/0348489 A1 * | 11/2022 | Adendorff | C25B 1/04 |
| 2023/0167559 A1 * | 6/2023 | Kapat | C25B 15/087 |
| | | | 290/54 |
| 2023/0340896 A1 * | 10/2023 | McDeed | F01K 13/00 |

FOREIGN PATENT DOCUMENTS

| | | | | |
|---|---|---|---|---|
| DE | 102018126496 A1 | | 10/2024 | |
| JP | H094418 A | * | 1/1997 | .......... F01K 25/005 |
| KR | 20220099385 A | * | 7/2022 | ............. C25B 1/042 |
| WO | 2020046118 A1 | | 3/2020 | |
| WO | WO-2022198273 A1 | * | 9/2022 | ............... F02C 6/14 |
| WO | WO-2024019723 A1 | * | 1/2024 | ............... C25B 1/04 |

* cited by examiner

SYSTEMS AND METHODS FOR OXY-COMBUSTION

CROSS-REFERENCE TO RELATED APPLICATIONS

This application claims priority to and the benefit of U.S. Provisional Patent Application No. 63/480,112 filed Jan. 17, 2023, which is hereby incorporated by reference in its entirety.

BACKGROUND

Oxy-combustion requires a pure oxygen source which is typically derived from an air separation unit to extract oxygen from air using membranes or cryogenic distillation. Because the air separation adds significant capital and operational expenditures to a project, oxy-fuel has often been limited to large scale applications such as power stations where the primary driver is $CO_2$ capture.

SUMMARY

In some embodiments, a method of oxy-combustion includes providing an electrolyzer feedstock to at least an electrolyzer cell; separating the electrolyzer feedstock into a hydrogen feedstock and an oxygen feedstock using the at least one electrolyzer cell; combusting a first feedstock derived from the hydrogen feedstock and a second feedstock derived from the oxygen feedstock in a furnace; controlling one or more of a second feedstock composition or a pressure in the furnace; and recycling an exhaust steam from the furnace, wherein at least one portion of exhaust steam from the furnace is recycled in at least one of a steam feedstock and the electrolyzer feedstock.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which.

DETAILED DESCRIPTION

Embodiments of the present disclosure generally relate to devices, systems, and methods for producing energy through oxy-combustion of hydrogen. Oxy-combustion of hydrogen is an exothermic process that combusts gaseous hydrogen ($H_2$) with gaseous oxygen ($O_2$). In some embodiments, the reagents (the hydrogen and the oxygen) are mixed with another gaseous material, such as steam, to slow the combustion process between the hydrogen and oxygen. In at least one example, the oxygen is mixed with steam prior to introduction into the furnace with the hydrogen. The hydrogen and oxygen are then allowed to combust at a slower rate than otherwise would occur, and the combustion produces heat, which may be used for industrial processes or to generate electricity.

In some examples, the combustion heat is used in industrial processes such as in the metals industry to smelt, recycle, temper, or otherwise heat-treat a metal stock, or other processes. In at least one example, the type or grade of steel produced is dependent on the temperature at which the iron and other alloying elements is heated and held. Precise control of the heat source for the foundry can be critical in the manufacturing process. Some metals processing such as "bright annealing" require a reducing atmosphere, hydrogen is often used industrially for this purpose. In some examples, the combustion heat is used to dry materials through vaporization of liquid phases. In some examples, the combustion heat is used to refine ores or other raw materials. The use of electricity to power resistive heaters or other electrical heating elements may be impractical or impossible for a particular site. In such examples, oxy-combustion of hydrogen according to some embodiments of the present disclosure provides an efficient and controllable heat production on demand with a lower carbon intensity than other options.

Figure 1:
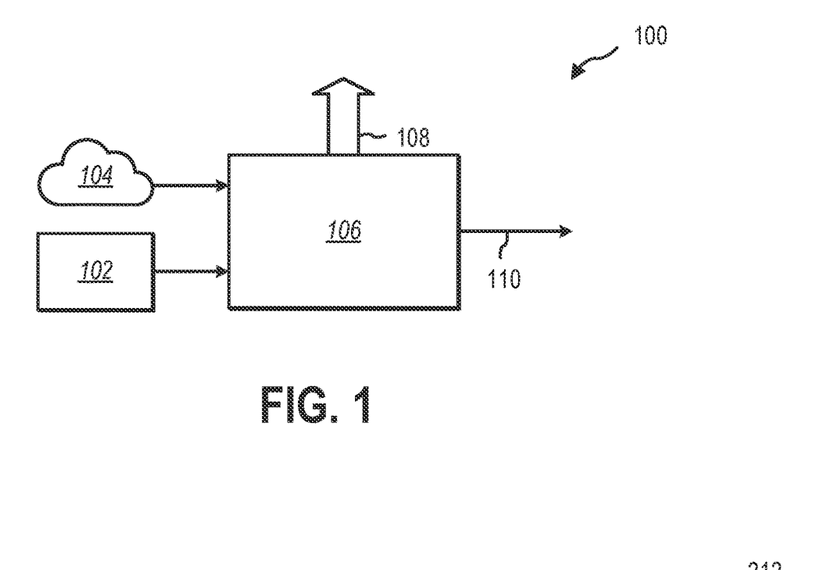
FIG. 1 is a schematic diagram of a conventional hydrogen combustion system.

FIG. 1 is a schematic diagram of convention system 100 of hydrogen combustion. The conventional system 100 includes a hydrocarbon fuel 102 that is combined with air 104 in a furnace 106. The air 104 has a composition of approximately 78% nitrogen gas ($N_2$) and approximately 21% oxygen gas, with the balance being other gases. While the combustion of the hydrocarbon fuel 102 and the oxygen gas in the air 104 in the furnace 106 produces water, the combustion of the nitrogen gas in the air 104 can produces nitrous oxide, and the combustion of the hydrocarbon fuels can produce carbon dioxide. The combustion in the furnace 106, therefore, produces heat 108 but also produces an exhaust 110 containing multiple components that need to be captured and/or sequestered. In addition, the leakage of methane and other hydrocarbons upstream of the combustion system is known to significantly increase the overall greenhouse gas emissions.

In contrast to combustion with air 104, oxy-combustion with a hydrocarbon fuel provides 30-50% reduction in energy requirements as nitrogen from the air 104 is excluded, removing this parasitic heat load. The process is often pursued as an emission reduction strategy. The exhaust 110 contains no nitrogen or nitrous oxide, making carbon dioxide separation, capture, and sequestration easier. The carbon dioxide can be separated from the water in the exhaust 110 by condensation. However, oxy-combustion with a hydrogen fuel, in contrast to a hydrocarbon fuel 102, can further reduce gas volumes and reduce and/or eliminate the need for carbon capture.

Because the gas volumes are reduced, the equipment can be smaller and consume less power during operation. Smaller equipment can also reduce capital and operational expenses of the system. In some embodiments, oxy-combustion of hydrogen fuels combusts substantially only hydrogen gas with oxygen gas, which produces heat and only water (i.e., steam) as an exhaust. Because water is the only exhaust, no separation, capture, and sequestration equipment is needed in association with the combustion. The water exhaust can be recycled to an electrolyzer cell, such as a solid oxide electrolyzer cell (SOEC), and separated into hydrogen gas and oxygen gas using an input electricity. As water vapor emissivity is higher than nitrogen or carbon dioxide, radiative heat transfer in hydrogen oxy-combustion can be improved shortening process times.

Figure 2:
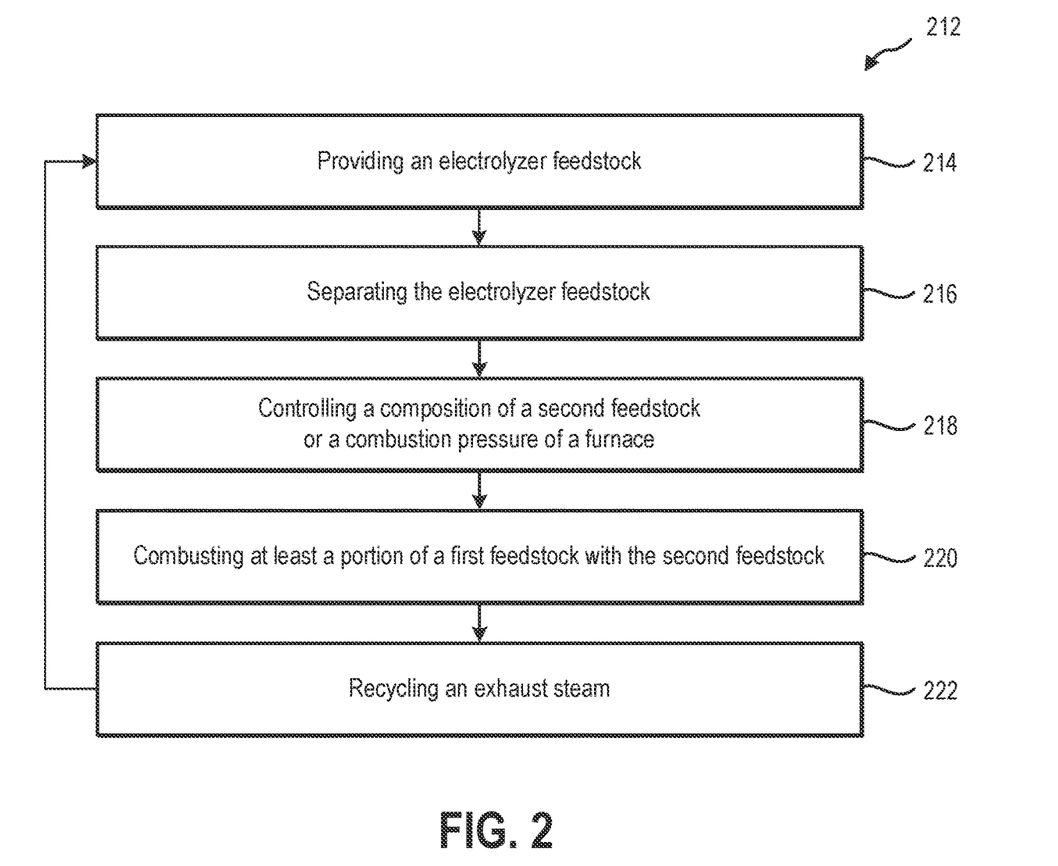
FIG. 2 is a flowchart illustrating a method of oxy-combustion, according to some embodiments of the present disclosure.

FIG. 2 is a flowchart illustrating a method 212 of oxy-combustion of hydrogen according to some embodiments of the present disclosure. In some embodiments, the method 212 includes providing an electrolyzer feedstock to an electrolyzer cell at 214. In some embodiments, the electrolyzer feedstock includes water. In some embodiments, the electrolyzer feedstock includes water in a steam phase. In some embodiments, the electrolyzer feedstock includes a second component that produces a reducing environment or atmosphere. In some embodiments, the electrolyzer feedstock contains at least 1% hydrogen gas. In some embodiments, the electrolyzer feedstock contains at least 5% hydrogen gas. In some embodiments, the electrolyzer feedstock contains at least 10% hydrogen gas. In some embodiments, the electrolyzer feedstock includes other reducing agents. In at least one embodiment, the reducing agent is hydrogen gas that is recycled from a hydrogen feedstock produced by the electrolyzer cell, as will be described herein.

In some embodiments, the method 212 further includes separating at least a portion of the electrolyzer feedstock into a hydrogen feedstock and an oxygen feedstock at 216. In some embodiments, the electrolyzer, such as a SOEC, uses an input electricity to separate water (steam) into the constituent hydrogen gas and oxygen gas. The hydrogen gas and oxygen gas are separated during the electrolysis and removed from the SOEC in separate fluid conduits. A hydrogen conduit carries the hydrogen gas as a hydrogen feedstock for later combustion, and an oxygen conduit carries the oxygen gas as an oxygen feedstock for later combustion with the hydrogen feedstock. In at least one embodiment, a portion of the hydrogen feedstock is mixed with water in the electrolyzer feedstock as a reducing agent. In some embodiments, the input electricity for the electrolysis is received from zero-emission or low-emission energy sources that allow a further reduction of carbon intensity of the method. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

In some embodiments, the method 212 further includes controlling at least one of a composition of a second feedstock derived from the oxygen feedstock and a combustion pressure of the furnace at 218, in particular to slow combustion rate. For example, a composition of the second feedstock may be adjusted by mixing a steam feedstock with the oxygen feedstock. As a combination of hydrogen feedstock and oxygen feedstock in a gaseous mixture without any other components can result in an explosive and potentially damaging or hazardous reaction rate, a mitigating agent is, in some embodiments, mixed with one or both of the feedstock gases to slow the combustion rate. In some embodiments, steam feedstock is mixed with the oxygen feedstock such that the oxygen gas is a stoichiometric percentage of no more than 30% of the total composition of the mixed oxygen feedstock. In some embodiments, steam feedstock is mixed with the oxygen feedstock such that the oxygen gas is a stoichiometric percentage of no more than 25% of the total composition of the mixed oxygen feedstock. In some embodiments, steam feedstock is mixed with the oxygen feedstock such that the oxygen gas is a stoichiometric percentage of no more than 20% of the total composition of the mixed oxygen feedstock. The lower the ratio of oxygen gas in the mixed oxygen feedstock, the slower and/or more diffuse the combustion of the hydrogen gas and the oxygen gas. In some embodiments, the combustion pressure within a combustion chamber of the furnace is set (e.g., lowered) to slow the combustion rate. For example, the combustion pressure may be set (e.g., reduced) below ambient atmospheric pressure to slow the combustion rate. In at least one example, the combustion pressure is set (e.g., reduced) to a partial vacuum. In some embodiments, the furnace is configured to combust the first feedstock and the second feedstock at a combustion pressure between 760 Torr and $1 \times 10^{-6}$ Torr. In some embodiments, the furnace is configured to combust the first feedstock and the second feedstock at a combustion pressure between 760 Torr and $1 \times 10^{-3}$ Torr.

In some embodiments, steam feedstock is mixed with the hydrogen feedstock such that the hydrogen gas is a stoichiometric percentage of no more than 60% of the total composition of the mixed hydrogen feedstock. In some embodiments, steam feedstock is mixed with the hydrogen feedstock such that the hydrogen gas is a stoichiometric percentage of no more than 50% of the total composition of the mixed hydrogen feedstock. In some embodiments, steam feedstock is mixed with the hydrogen feedstock such that the hydrogen gas is a stoichiometric percentage of no more than 40% of the total composition of the mixed hydrogen feedstock.

In some embodiments, steam feedstock is introduced into the furnace separately from the hydrogen feedstock and the oxygen feedstock. In some embodiments, steam feedstock is provided in at least a 50% stoichiometric percentage of the total composition of the feedstock gases (hydrogen feedstock, oxygen feedstock, and steam feedstock) in the furnace. In some embodiments, steam feedstock is provided in at least a 60% stoichiometric percentage of the total composition of the feedstock in the furnace. In some embodiments, steam feedstock is provided in at least a 66% stoichiometric percentage of the total composition of the feedstock in the furnace.

In some embodiments, the method 212 further includes combusting at least part of a first feedstock derived from the hydrogen feedstock with the second feedstock at 220. The combustion produces heat. In some embodiments, the heat is used to heat materials in an industrial process. In some embodiments, the heat is used to drive a turbine or piston in a generator to produce electricity. In some embodiments, the heat is used to drive a turbine or piston in a generator to produce a motive force.

In some embodiments, the method 212 further includes recycling an exhaust steam produced by the combustion of the first feedstock and the second feedstock at 222. Oxy-combustion of hydrogen feedstock and oxygen feedstock produces water (i.e., steam) as an exhaust. In some embodiments, at least a portion of the exhaust steam is recycled as steam feedstock, such as described above. In some embodiments, at least a portion of the exhaust steam is recycled as electrolyzer feedstock, such as described above. In some embodiments, a first portion of the exhaust steam is recycled as steam feedstock and a second portion of the exhaust steam is recycled as electrolyzer feedstock.

Figure 3:
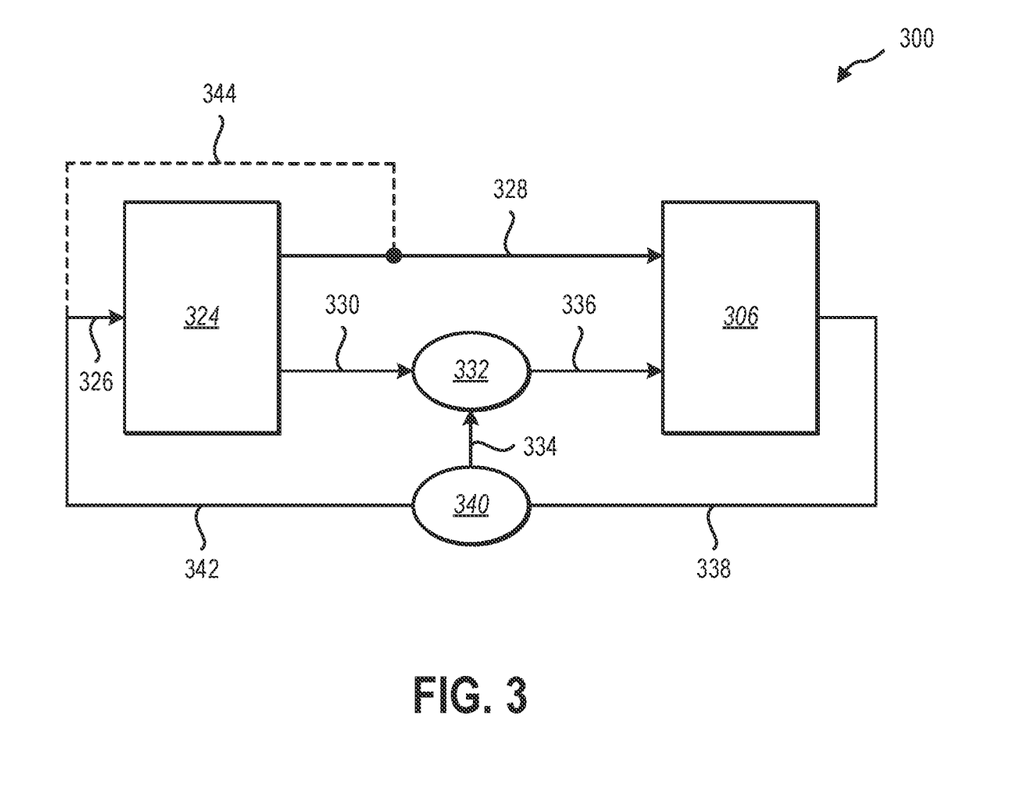
FIG. 3 is a schematic diagram of an oxy-combustion system, according to some embodiments of the present disclosure.

FIG. 3 is a schematic diagram of a system 300 of oxy-combustion in hydrogen according to some embodiments of the present disclosure. In some embodiments, the system 300 of FIG. 3 may be used to perform at least a portion of (or all of) some embodiments of the method 212 described in relation to FIG. 2. In some embodiments, the system 300 includes an electrolyzer 324 that receives an electrolyzer feedstock 326. The electrolyzer 324 uses an input electricity (not illustrated in FIG. 3) to separate water of the electrolyzer feedstock 326 into a hydrogen feedstock 328 in a hydrogen conduit (e.g., pipe, hose, duct, or other fluid conduit) and an oxygen feedstock 330 in an oxygen conduit. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

In some embodiments, the oxygen feedstock 330 is mixed at a mixer 332 with a steam feedstock 334 to produce a mixed oxygen feedstock 336. In some embodiments, the mixer 332 mixes steam feedstock 334 with the hydrogen feedstock 328 prior to the hydrogen feedstock 328 being delivered to a furnace 306. In some embodiments, the steam feedstock 334 is provided directly to the furnace 306 and mixes with the hydrogen feedstock 328 and the oxygen feedstock 330 in a combustion chamber of the furnace 306.

In some embodiments, the combustion of hydrogen gas and oxygen gas in the furnace 306 produces exhaust including or consisting of steam. The exhaust steam 338 is, in some embodiments, recycled for use in the system 300. In some embodiments, the exhaust steam 338 is directed through an exhaust conduit to a splitter 340 that separates a first portion of the exhaust steam and directs the first portion toward the mixer 332 as the steam feedstock 334. The splitter 340 separates a second portion of the exhaust steam and directs the second portion toward the electrolyzer 324 as the electrolyzer feedstock 326 or a recycled steam portion 342 of the electrolyzer feedstock 326. For example, the electrolyzer feedstock 326 may include the recycled steam portion 342 and a reducing hydrogen gas 344 mixed together. In some embodiments, the reducing hydrogen gas 344 is a portion of the hydrogen feedstock 328 that is diverted and recycled back into the electrolyzer feedstock 326 to maintain a reducing environment in the electrolyzer 324.

In some embodiments, the input electricity is used to heat the electrolyzer feedstock 326 during or prior to separating at the electrolyzer 324. For example, separating the electrolyzer feedstock may occur at a temperature greater than 300° C., greater than 400° C., greater than 500° C., greater than 600° C., greater than 700° C., or greater than 800° C. In some embodiments, the high temperature recycled steam 342 reduces heating requirements of electrolyzer feedstock 326 at the electrolyzer 324, which can reduce the need for additional heating and/or eliminate the need for a heating element prior to the electrolyzer 324 further improving efficiency and reducing capital and operating expenses.

Figure 4:
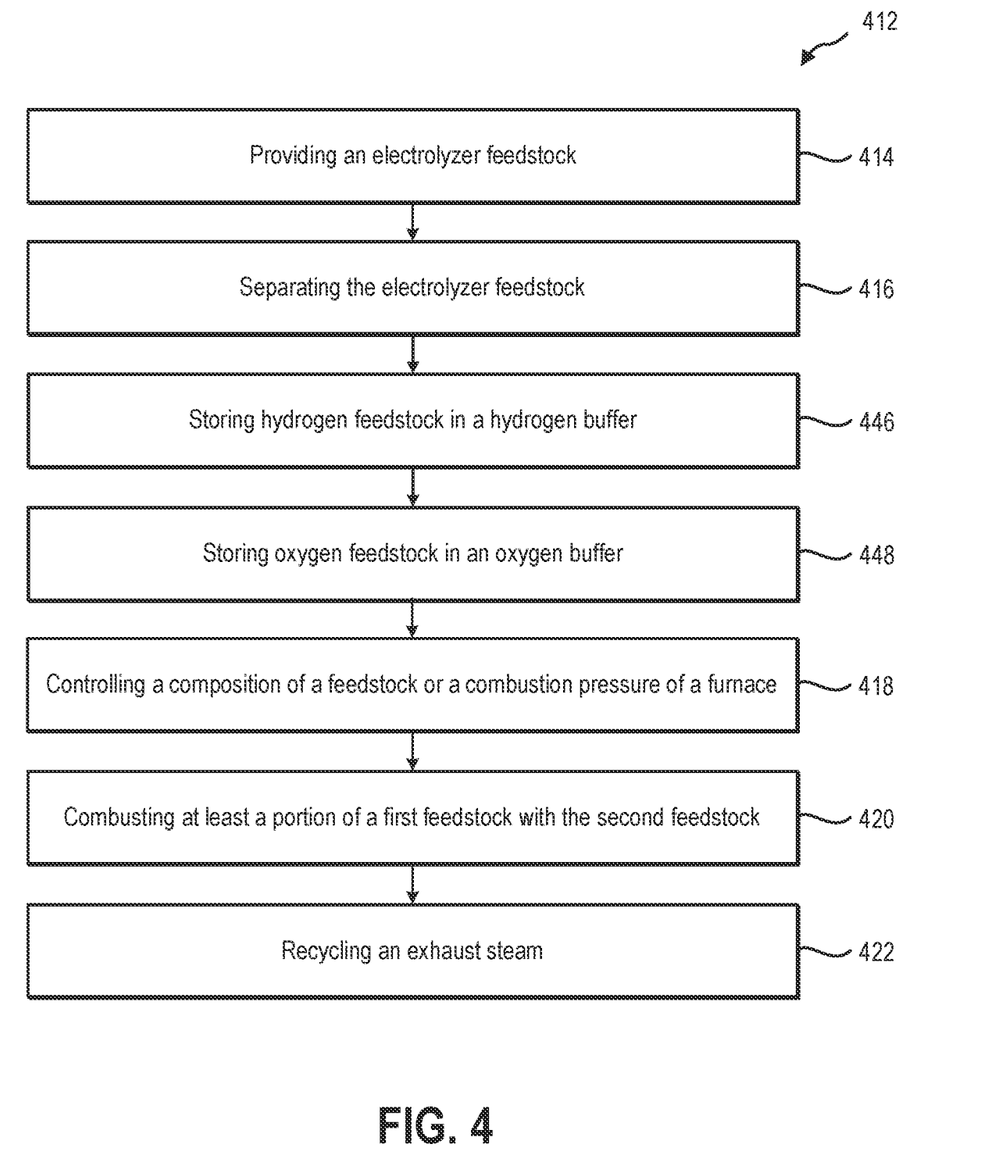
FIG. 4 is a flowchart illustrating a method of buffered oxy-combustion, according to some embodiments of the present disclosure.

In some embodiments, oxy-combustion of hydrogen fuel is buffered through one or more storage tanks to allow the separation of the hydrogen feedstock and oxygen feedstock to occur at a different time than the combustion of the hydrogen feedstock and oxygen feedstock (or mixed oxygen feedstock). Buffering of the process between the separation and the combustion can allow the use of off-peak input electricity or electricity from variable renewable sources, while maintaining combustion on-demand for heat and/or electricity generation. FIG. 4 is a flowchart illustrating a method 412 of oxy-combustion of hydrogen with buffered combustion according to some embodiments of the present disclosure.

In some embodiments, the method 412 includes providing an electrolyzer feedstock to an electrolyzer cell at 414. In some embodiments, the electrolyzer feedstock includes water. In some embodiments, the electrolyzer feedstock includes water in a steam phase. In some embodiments, the electrolyzer feedstock includes a second component that produces a reducing environment or atmosphere. In some embodiments, the electrolyzer feedstock contains at least 1% hydrogen gas. In some embodiments, the electrolyzer feedstock contains at least 5% hydrogen gas. In some embodiments, the electrolyzer feedstock contains at least 10% hydrogen gas. In some embodiments, the electrolyzer feedstock includes other reducing agents. In at least one embodiment, the reducing agent is hydrogen gas that is recycled from a hydrogen feedstock produced by the electrolyzer cell, as will be described herein.

In some embodiments, the method 412 further includes separating at least a portion of the electrolyzer feedstock into a hydrogen feedstock and an oxygen feedstock at 416. In some embodiments, the electrolyzer, such as a SOEC, uses an input electricity to separate water (steam) into the constituent hydrogen gas and oxygen gas. The hydrogen gas and oxygen gas are separated during the electrolysis and removed from the SOEC in separate fluid conduits. A hydrogen conduit carries the hydrogen gas as a hydrogen feedstock for later combustion, and an oxygen conduit carries the oxygen gas as an oxygen feedstock for later combustion with the hydrogen feedstock.

In at least one embodiment, a portion of the hydrogen feedstock is mixed with water in the electrolyzer feedstock as a reducing agent. In some embodiments, the input electricity for the electrolysis is received from zero-emission or low-emission energy sources that allow a further reduction of carbon intensity of the method. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

The method 412 further includes storing the hydrogen feedstock in a hydrogen buffer at 446 and storing the oxygen feedstock in an oxygen buffer at 448. For example, the hydrogen buffer and/or oxygen buffer may be storage tanks that connect to the hydrogen conduit and/or the oxygen conduit, respectively, through a selectively actuated valve. In some embodiments, the valve allows the feedstock gas to selectively be directed from the electrolyzer to the buffer, and selectively directed from the buffer toward the furnace. In at least one embodiment, the valve directs the feedstock gas from the buffer toward a mixer. As will be described in more detail herein, the valve and/or buffer may be selectively controlled based at least partially on grid information received at a controller from a local power grid. In some embodiments, the grid information includes electricity pricing information and/or grid load information. For example, when the electricity pricing information indicates an electricity price from the local grid below a threshold value, the controller causes the system to separate and store the hydrogen feedstock and oxygen feedstock for later combustion. In some embodiments, when the grid load information indicates the local grid is under load, the controller causes the system to combust stored hydrogen feedstock and/or oxygen feedstock to produce electricity to supply electricity to the grid.

In some embodiments, the method 412 further includes controlling at least one of a composition of a second feedstock derived from the oxygen feedstock and a combustion pressure of the furnace at 418. For example, a composition of the second feedstock may be adjusted by mixing a steam feedstock with the oxygen feedstock. As a combination of hydrogen feedstock and oxygen feedstock in a gaseous mixture without any other components can result in an explosive and potentially damaging or hazardous reaction rate, a mitigating agent is, in some embodiments, mixed with one or both of the feedstock gases to slow the combustion rate. In some embodiments, steam feedstock is mixed with the oxygen feedstock such that the oxygen gas is a stoichiometric percentage of no more than 30% of the total composition of the mixed oxygen feedstock. In some embodiments, steam feedstock is mixed with the oxygen feedstock such that the oxygen gas is a stoichiometric percentage of no more than 25% of the total composition of the mixed oxygen feedstock. In some embodiments, steam feedstock is mixed with the oxygen feedstock such that the oxygen gas is a stoichiometric percentage of no more than 20% of the total composition of the mixed oxygen feedstock. The lower the ratio of oxygen gas in the mixed oxygen feedstock, the slower and/or more diffuse the combustion of the hydrogen gas and the oxygen gas.

In some embodiments, steam feedstock is mixed with the hydrogen feedstock such that the hydrogen gas is a stoichiometric percentage of no more than 60% of the total composition of the mixed hydrogen feedstock. In some embodiments, steam feedstock is mixed with the hydrogen feedstock such that the hydrogen gas is a stoichiometric percentage of no more than 50% of the total composition of the mixed hydrogen feedstock. In some embodiments, steam feedstock is mixed with the hydrogen feedstock such that the hydrogen gas is a stoichiometric percentage of no more than 40% of the total composition of the mixed hydrogen feedstock.

In some embodiments, steam feedstock is introduced into the furnace separately from the hydrogen feedstock and the oxygen feedstock. In some embodiments, steam feedstock is provided in at least a 50% stoichiometric percentage of the total composition of the feedstock gases (hydrogen feedstock, oxygen feedstock, and steam feedstock) in the furnace. In some embodiments, steam feedstock is provided in at least a 60% stoichiometric percentage of the total composition of the feedstock in the furnace. In some embodiments, steam feedstock is provided in at least a 66% stoichiometric percentage of the total composition of the feedstock in the furnace. In some embodiments, the combustion pressure within a combustion chamber of the furnace is lowered to slow the combustion rate. For example, the combustion pressure may be reduced below ambient atmospheric pressure to slow the combustion rate. In at least one example, the combustion pressure is reduced to a partial vacuum.

In some embodiments, the method 412 further includes combusting at least part of a first feedstock derived from the hydrogen feedstock with the second feedstock at 420. The combustion produces heat. In some embodiments, the heat is used to heat materials in an industrial process. In some embodiments, the heat is used to drive a turbine or piston in a generator to produce electricity. In some embodiments, the heat is used to drive a turbine or piston in a generator to produce a motive force.

In some embodiments, the method 412 further includes recycling an exhaust steam produced by the combustion of the first feedstock and the second feedstock at 422. Oxy-combustion of hydrogen feedstock and oxygen feedstock produces water (i.e., steam) as an exhaust. In some embodiments, at least a portion of the exhaust steam is recycled as steam feedstock, such as described above. In some embodiments, at least a portion of the exhaust steam is recycled as electrolyzer feedstock, such as described above. In some embodiments, a first portion of the exhaust steam is recycled as steam feedstock and a second portion of the exhaust steam is recycled as electrolyzer feedstock.

Figure 5:
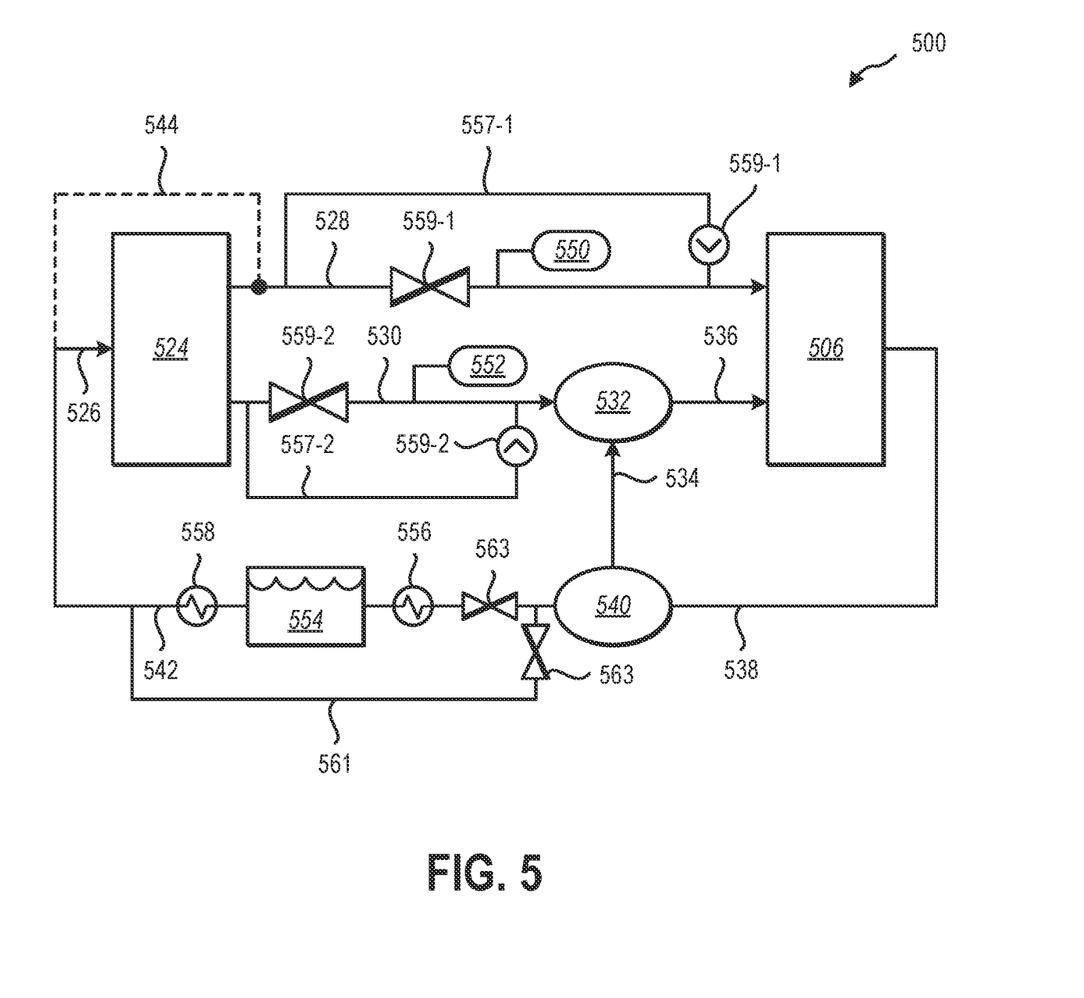
FIG. 5 is a schematic diagram of a buffered oxy-combustion system, according to some embodiments of the present disclosure.

FIG. 5 is a schematic diagram of a system 500 of buffered oxy-combustion in hydrogen according to some embodiments of the present disclosure. In some embodiments, the system 500 of FIG. 5 may be used to perform at least a portion of (or all of) some embodiments of the method 412 described in relation to FIG. 4. In some embodiments, the system 500 includes an electrolyzer 524 that receives an electrolyzer feedstock 526. The electrolyzer 524 uses an input electricity (not illustrated in FIG. 5) to separate water of the electrolyzer feedstock 526 into a hydrogen feedstock 528 in a hydrogen conduit and an oxygen feedstock 530 in an oxygen conduit. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

In some embodiments, the oxygen feedstock 530 is mixed at a mixer 532 with a steam feedstock 534 to produce a mixed oxygen feedstock 536. In some embodiments, the mixer 532 mixes steam feedstock 534 with the hydrogen feedstock 528 prior to the hydrogen feedstock 528 being delivered to a furnace 506. In some embodiments, the steam feedstock 534 is provided directly to the furnace 506 and mixes with the hydrogen feedstock 528 and the oxygen feedstock 530 in a combustion chamber of the furnace 506.

In some embodiments, the combustion of hydrogen gas and oxygen gas in the furnace 506 produces exhaust including or consisting of steam. The exhaust steam 538 is, in some embodiments, recycled for use in the system 500. In some embodiments, the exhaust steam 538 is directed through an exhaust conduit to a splitter 540 that separates a first portion of the exhaust steam and directs the first portion toward the mixer 532 as the steam feedstock 534. The splitter 540 separates a second portion of the exhaust steam and directs the second portion toward the electrolyzer 524 as the electrolyzer feedstock 526 or a recycled steam portion 542 of the electrolyzer feedstock 526. For example, the electrolyzer feedstock 526 may include the recycled steam portion 542 and a reducing hydrogen gas 544 mixed together. In some embodiments, the reducing hydrogen gas 544 is a portion of the hydrogen feedstock 528 that is diverted and recycled back into the electrolyzer feedstock 526 to maintain a reducing environment in the electrolyzer 524.

In some embodiments, the input electricity is used to heat the electrolyzer feedstock 526 during or prior to separating at the electrolyzer 524. For example, separating the electrolyzer feedstock may occur at a temperature greater than 300° C., greater than 400° C., 500° C., greater than 600° C., greater than 700° C., or greater than 800° C. In some embodiments, the high temperature recycled steam 542 reduces heating requirements of electrolyzer feedstock 526 at the electrolyzer 524, which can reduce the need for additional heating and/or eliminate the need for a heating element prior to the electrolyzer 524 further improving efficiency and reducing capital and operating expenses.

As described in relation to FIG. 4, in some embodiments, the cycle of oxy-combustion can be buffered to temporally decouple the separation of the hydrogen feedstock and the oxygen feedstock from the combustion of the hydrogen feedstock and the oxygen feedstock. In some embodiments, the system 500 includes a hydrogen buffer 550 that is configured to selectively receive and/or selectively release hydrogen feedstock 528. For example, the electrolyzer 524 may consume input electricity during off-peak times or consume input electricity from a variable renewable energy source when available to separate the electrolyzer feedstock 526. The produced hydrogen feedstock 528 and oxygen feedstock 530 are subsequently directed to the hydrogen buffer 550 and oxygen buffer 552, respectively, to store the hydrogen feedstock 528 and oxygen feedstock 530 therein. When oxy-combustion of the hydrogen feedstock 528 and oxygen feedstock 530 in the furnace 506 is required, the hydrogen buffer 550 and oxygen buffer 552 release the hydrogen feedstock 528 and oxygen feedstock 530, respectively, toward the furnace 506 for combustion.

In some embodiments, the system 500 further includes a water buffer 554 configured to store and/or buffer the flow of water from the exhaust steam 538 to the electrolyzer 524. For example, a water buffer 554 may store the recycled exhaust steam 542 that is directed toward the electrolyzer 524 for use as electrolyzer feedstock 526. In some embodiments, the water buffer 554 stored the recycled exhaust steam 542 in a liquid phase. For example, the water buffer 554 includes or is in-line with a condenser 556 that condenses the recycled exhaust steam 542 into a liquid phase. In some embodiments, the water buffer 554 selectively releases the liquid phase water toward a boiler 558 that vaporizes the water into steam, which is directed toward the electrolyzer 524.

In some embodiments, the system 500 further comprising one or more bypasses to allow the system 500 to operate in an oxy-combustion/electrolysis cycle with minimal interferences. For example, bypasses around the buffers can increase efficiency by reducing and/or eliminating the number of components through which gases or liquids pass. In some embodiments, a first feedstock bypass 557-1 and a second feedstock bypass 557-2 allow the system to selectively bypass the hydrogen buffer 550 and/or the oxygen buffer 552, respectively. In some embodiments, a first feedstock valve(s) 559-1 and second feedstock valve(s) 559-2 selectively control fluid flow through the first feedstock bypass 557-1 and the second feedstock bypass 557-2, respectively. In some embodiments, the valves 559-1, 559-2 are electronically controlled, such as by a controller in data communication with a local power grid. In some examples, the controller may determine when to actuate the valves 559-1, 559-2 and bypass the buffers 550, 552 based at least partially on grid information, as will be described in more detail herein. In some embodiments, a tank bypass 561 includes a conduit and valves 563 that allows the recycled exhaust steam 542 to bypass the condenser 556, tank 554, and boiler 558 to allow more efficient flow of the recycled exhaust steam 542 toward the electrolyzer 524.

Figure 6:
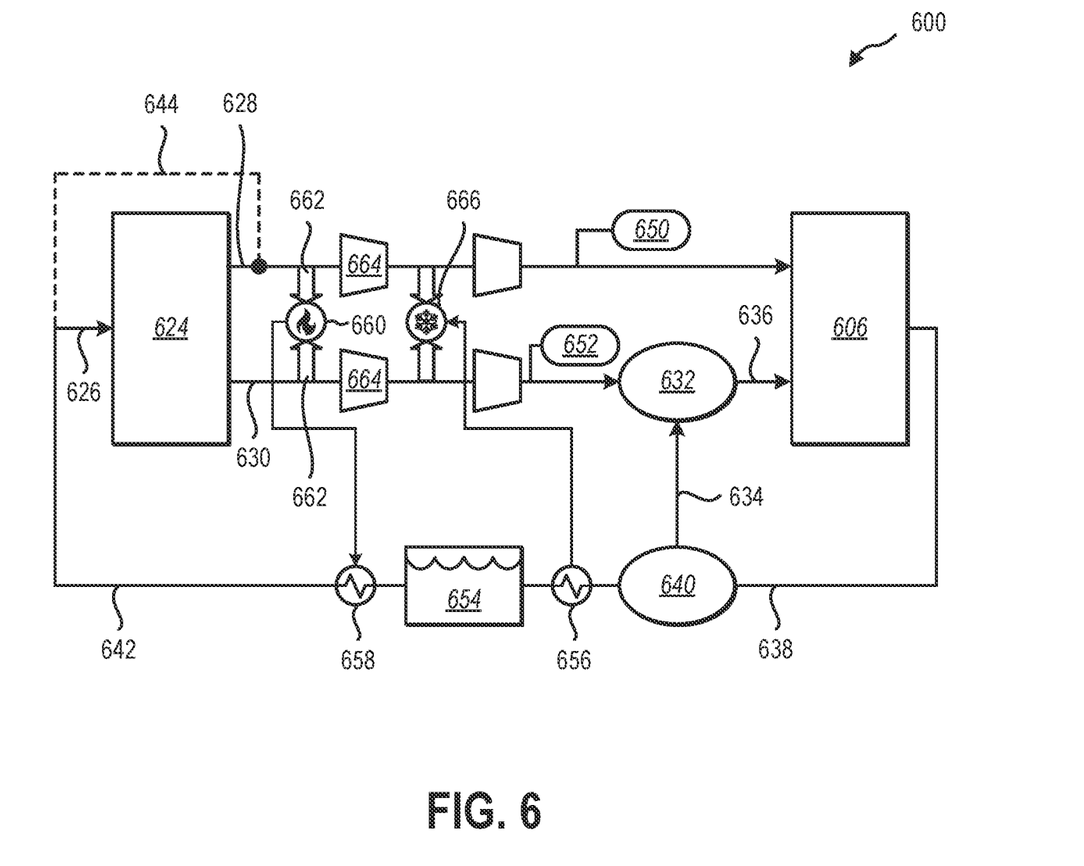
FIG. 6 is a schematic diagram of a buffered oxy-combustion system with thermal recycling, according to some embodiments of the present disclosure.

In some embodiments, efficiency of the system 500 is further increased by capturing and recycling thermal energy within the system. FIG. 6 is a schematic diagram of a system 600 of oxy-combustion in hydrogen with thermal capture and recycling according to some embodiments of the present disclosure. In some embodiments, the system 600 includes an electrolyzer 624 that receives an electrolyzer feedstock 626. The electrolyzer 624 uses an input electricity to separate water of the electrolyzer feedstock 626 into a hydrogen feedstock 628 in a hydrogen conduit and an oxygen feedstock 630 in an oxygen conduit. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

In some embodiments, the oxygen feedstock 630 is mixed at a mixer 632 with a steam feedstock 634 to produce a mixed oxygen feedstock 636. In some embodiments, the mixer 632 mixes steam feedstock 634 with the hydrogen feedstock 628 prior to the hydrogen feedstock 628 being delivered to a furnace 606. In some embodiments, the steam feedstock 634 is provided directly to the furnace 606 and mixes with the hydrogen feedstock 628 and the oxygen feedstock 630 in a combustion chamber of the furnace 606.

In some embodiments, the combustion of hydrogen gas and oxygen gas in the furnace 606 produces exhaust including or consisting of steam. The exhaust steam 638 is, in some embodiments, recycled for use in the system 600. In some embodiments, the exhaust steam 638 is directed through an exhaust conduit to a splitter 640 that separates a first portion of the exhaust steam and directs the first portion toward the mixer 632 as the steam feedstock 634. The splitter 640 separates a second portion of the exhaust steam and directs the second portion toward the electrolyzer 624 as the electrolyzer feedstock 626 or a recycled steam portion 642 of the electrolyzer feedstock 626. For example, the electrolyzer feedstock 626 may include the recycled steam portion 642 and a reducing hydrogen gas 644 mixed together. In some embodiments, the reducing hydrogen gas 644 is a portion of the hydrogen feedstock 628 that is diverted and recycled back into the electrolyzer feedstock 626 to maintain a reducing environment in the electrolyzer 624.

In some embodiments, the input electricity is used to heat the electrolyzer feedstock 626 during or prior to separating at the electrolyzer 624. For example, separating the electrolyzer feedstock may occur at a temperature greater than 300° C., greater than 400° C., greater than 500° C., greater than 600° C., greater than 700° C., or greater than 800° C. In some embodiments, the high temperature recycled steam 642 reduces heating requirements of electrolyzer feedstock 626 at the electrolyzer 624, which can reduce the need for additional heating and/or eliminate the need for a heating element prior to the electrolyzer 624 further improving efficiency and reducing capital and operating expenses.

In some embodiments, the cycle of oxy-combustion is buffered to temporally decouple the separation of the hydrogen feedstock and the oxygen feedstock from the combustion of the hydrogen feedstock and the oxygen feedstock. In some embodiments, the system 600 includes a hydrogen buffer 650 that is configured to selectively receive and/or selectively release hydrogen feedstock 628. For example, the electrolyzer 624 may consume input electricity during off-peak times or consume input electricity from a variable renewable energy source when available to separate the electrolyzer feedstock 626. The produced hydrogen feedstock 628 and oxygen feedstock 630 are subsequently directed to the hydrogen buffer 650 and oxygen buffer 652, respectively, to store the hydrogen feedstock 628 and oxygen feedstock 630 therein. When oxy-combustion of the hydrogen feedstock 628 and oxygen feedstock 630 in the furnace 606 is required, the hydrogen buffer 650 and oxygen buffer 652 release the hydrogen feedstock 628 and oxygen feedstock 630, respectively, toward the furnace 606 for combustion.

In some embodiments, the system 600 further includes a water buffer 654 configured to store and/or buffer the flow of water from the exhaust steam 638 to the electrolyzer 624. For example, a water buffer 654 may store the recycled exhaust steam 642 that is directed toward the electrolyzer 624 for use as electrolyzer feedstock 626. In some embodiments, the water buffer 654 stored the recycled exhaust steam 642 in a liquid phase. For example, the water buffer 654 includes or is in-line with a condenser 656 that condenses the recycled exhaust steam 642 into a liquid phase. In some embodiments, the water buffer 654 selectively releases the liquid phase water toward a boiler 658 that vaporizes the water into steam, which is directed toward the electrolyzer 624.

In some embodiments, the hydrogen feedstock 628 and/or oxygen feedstock 630 is cooled and/or compressed prior to storage or combustion. In some embodiments, a high temperature thermal store 660 receives heat 662 from the hydrogen feedstock 628 and/or the oxygen feedstock 630 prior to or during a series of compressors 664 configured to compress the hydrogen feedstock 628 and/or the oxygen feedstock 630. In such embodiments, the high temperature thermal store 660 stores the extracted heat 662 from the hydrogen feedstock 628 and/or the oxygen feedstock 630, which is selectively provided to other components of the system 600. In at least one example, the stored heat in the high temperature thermal store is recycled to the boiler 658 to vaporize water from the water buffer 654. In some embodiments, a high temperature thermal store 660 receives heat 662 from the hydrogen feedstock 628 and/or the oxygen feedstock 630 prior to or during a series of compressors 664 configured to compress the hydrogen feedstock 628 and/or the oxygen feedstock 630. In some embodiments, a cold temperature thermal store 666 is actively cooled (such as via Peltier cooling or convective liquid cooling) or passively cooled (such as via environmental cooling in regions with low ambient temperatures) to provide a heat sink that may receive exhaust heat from components of the system 600. In some embodiments, the cold temperature thermal store 666 receives heat 662 from the hydrogen feedstock 628 and/or the oxygen feedstock 630 prior to or during the series of compressors 664. In some embodiments, the cold temperature thermal store 666 receives heat from the condenser 656 to cool the condenser 656 and facilitate cooling and condensing at least a portion of the exhaust steam.

In some embodiments, the high temperature thermal store 660 is or includes a solid mass (such as a metal mass) that can achieve and maintain an elevated temperature (above that of other components of the system 600) for subsequent usage of the heat. In some embodiments, the high temperature thermal store 660 is or includes a phase-change material that uses the latent heat of phase transitions to receive and retain thermal energy with no associated increase in temperature. In some embodiments, the cold temperature thermal store 666 is or includes a solid mass (such as a metal mass or ice) that can achieve and maintain a lower temperature (less than that of other components of the system 600) for subsequent receipt of exhaust heat. In some embodiments, the cold temperature thermal store 666 is or includes a liquid mass, such as a gel or liquid. In some embodiments, the cold temperature thermal store 666 is or includes a multi-phase thermal mass, such as an ice slurry or other phase-change material that uses the latent heat of phase transitions to receive and retain exhaust heat with no associated increase in temperature. In some embodiments, a heat pump actively transfers heat between the cold temperature thermal store 666 and the high temperature thermal store 660.

Figure 7:
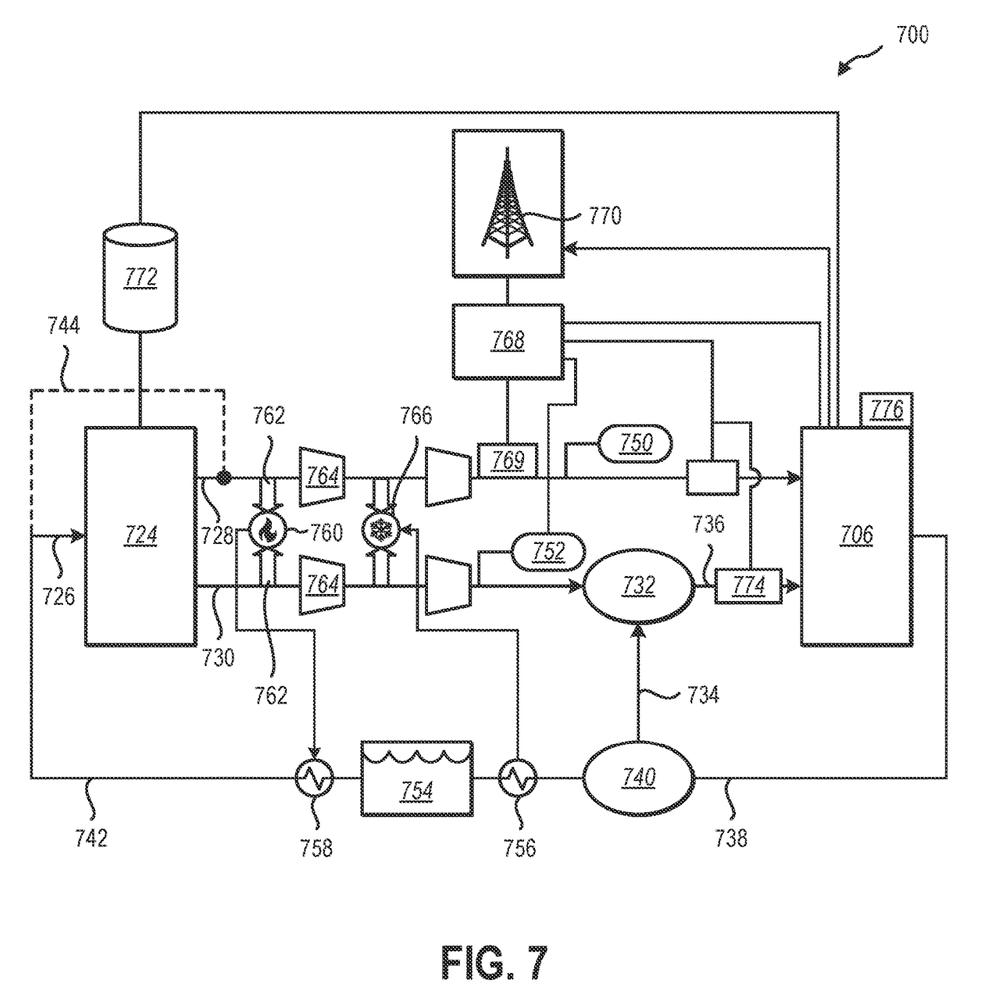
FIG. 7 is a schematic diagram of a buffered oxy-combustion system participating in a local power grid, according to some embodiments of the present disclosure.

FIG. 7 is a schematic diagram of a system 700 of oxy-combustion in hydrogen participating in a local power grid according to some embodiments of the present disclosure. In some embodiments, the system 700 includes an electrolyzer 724 that receives an electrolyzer feedstock 726. The electrolyzer 724 uses an input electricity from a local power grid 770 to separate water of the electrolyzer feedstock 726 into a hydrogen feedstock 728 in a hydrogen conduit and an oxygen feedstock 730 in an oxygen conduit. In some embodiments, the input electricity is further used to heat the electrolyzer feedstock during or prior to separating the electrolyzer feedstock. For example, separating the electrolyzer feedstock may occur at a temperature greater than 300° C., greater than 400° C., greater than 500° C., greater than 600° C., greater than 700° C., or greater than 800° C.

In some embodiments, the oxygen feedstock 730 is mixed at a mixer 732 with a steam feedstock 734 to produce a mixed oxygen feedstock 736. In some embodiments, the mixer 732 mixes steam feedstock 734 with the hydrogen feedstock 728 prior to the hydrogen feedstock 728 being delivered to a furnace 706. In some embodiments, the steam feedstock 734 is provided directly to the furnace 706 and mixes with the hydrogen feedstock 728 and the oxygen feedstock 730 in a combustion chamber of the furnace 706.

In some embodiments, the combustion of hydrogen gas and oxygen gas in the furnace 706 produces exhaust including or consisting of steam. The exhaust steam 738 is, in some embodiments, recycled for use in the system 700. In some embodiments, the exhaust steam 738 is directed through an exhaust conduit to a splitter 740 that separates a first portion of the exhaust steam and directs the first portion toward the mixer 732 as the steam feedstock 734. The splitter 740 separates a second portion of the exhaust steam and directs the second portion toward the electrolyzer 724 as the electrolyzer feedstock 726 or a recycled steam portion 742 of the electrolyzer feedstock 726. For example, the electrolyzer feedstock 726 may include the recycled steam portion 742 and a reducing hydrogen gas 744 mixed together. In some embodiments, the reducing hydrogen gas 744 is a portion of the hydrogen feedstock 728 that is diverted and recycled back into the electrolyzer feedstock 726 to maintain a reducing environment in the electrolyzer 724.

In some embodiments, the input electricity from the local power grid 770 is used to heat the electrolyzer feedstock 726 during or prior to separating at the electrolyzer 724. For example, separating the electrolyzer feedstock may occur at a temperature greater than 300° C., greater than 400° C., greater than 500° C., greater than 600° C., greater than 700° C., or greater than 800° C. In some embodiments, the high temperature recycled steam 742 reduces heating requirements of electrolyzer feedstock 726 at the electrolyzer 724, which can reduce the need for additional heating and/or eliminate the need for a heating element prior to the electrolyzer 724 further improving efficiency and reducing capital and operating expenses.

In some embodiments, the cycle of oxy-combustion is buffered to temporally decouple the separation of the hydrogen feedstock and the oxygen feedstock from the combustion of the hydrogen feedstock and the oxygen feedstock. In some embodiments, the system 700 includes a hydrogen buffer 750 that is configured to selectively receive and/or selectively release hydrogen feedstock 728. In some embodiments, a controller 768 receives grid information from the local power grid 770, and the controller 768 causes the electrolyzer 724, based at least partially on the grid information, to consume input electricity from the power grid 770 during off-peak times or consume input electricity from a variable renewable energy source when available to separate the electrolyzer feedstock 726. The produced hydrogen feedstock 728 and oxygen feedstock 730 are subsequently directed by one or more valves controlled by the controller 768 to the hydrogen buffer 750 and oxygen buffer 752, respectively, to store the hydrogen feedstock 728 and oxygen feedstock 730 therein. When oxy-combustion of the hydrogen feedstock 728 and oxygen feedstock 730 in the furnace 706 is required, the controller 768 instructs the hydrogen buffer 750 and oxygen buffer 752 to release the hydrogen feedstock 728 and oxygen feedstock 730, respectively, toward the furnace 706 for combustion. In some embodiments, the controller 768 includes a processor and a hardware storage device in communication with the processor with instructions stored thereon, which, when executed by the processor, cause the controller 768 to perform at least part of any method described herein.

In some embodiments, the system 700 further includes a water buffer 754 configured to store and/or buffer the flow of water from the exhaust steam 738 to the electrolyzer 724. For example, a water buffer 754 may store the recycled exhaust steam 742 that is directed toward the electrolyzer 724 for use as electrolyzer feedstock 726. In some embodiments, the water buffer 754 stored the recycled exhaust steam 742 in a liquid phase. For example, the water buffer 754 includes or is in-line with a condenser 756 that condenses the recycled exhaust steam 742 into a liquid phase. In some embodiments, the water buffer 754 selectively releases the liquid phase water toward a boiler 758 that vaporizes the water into steam, which is directed toward the electrolyzer 724.

In some embodiments, the hydrogen feedstock 728 and/or oxygen feedstock 730 is cooled and/or compressed prior to storage or combustion. In some embodiments, a high temperature thermal store 760 receives heat 762 from the hydrogen feedstock 728 and/or the oxygen feedstock 730 prior to or during a series of compressors 764 configured to compress the hydrogen feedstock 728 and/or the oxygen feedstock 730. In such embodiments, the high temperature thermal store 760 stores the extracted heat 762 from the hydrogen feedstock 728 and/or the oxygen feedstock 730, which is selectively provided to other components of the system 700. In at least one example, the stored heat in the high temperature thermal store is recycled to the boiler 758 to vaporize water from the water buffer 754. In some embodiments, a high temperature thermal store 760 receives heat 762 from the hydrogen feedstock 728 and/or the oxygen feedstock 730 prior to or during a series of compressors 764 configured to compress the hydrogen feedstock 728 and/or the oxygen feedstock 730. In some embodiments, a cold temperature thermal store 766 is actively cooled (such as via Peltier cooling or convective liquid cooling) or passively cooled (such as via environmental cooling in regions with low ambient temperatures) to provide a heat sink that may receive exhaust heat from components of the system 700. In some embodiments, the cold temperature thermal store 766 receives heat 762 from the hydrogen feedstock 728 and/or the oxygen feedstock 730 prior to or during the series of compressors 764. In some embodiments, the cold temperature thermal store 766 receives heat from the condenser 756 to cool the condenser 756 and facilitate cooling and condensing at least a portion of the exhaust steam.

In some embodiments, the high temperature thermal store 760 is or includes a solid mass (such as a metal mass) that can achieve and maintain an elevated temperature (above that of other components of the system 700) for subsequent usage of the heat. In some embodiments, the high temperature thermal store 760 is or includes a phase-change material that uses the latent heat of phase transitions to receive and retain thermal energy with no associated increase in temperature. In some embodiments, the cold temperature thermal store 766 is or includes a solid mass (such as a metal mass or ice) that can achieve and maintain a lower temperature (less than that of other components of the system 700) for subsequent receipt of exhaust heat. In some embodiments, the cold temperature thermal store 766 is or includes a liquid mass, such as a gel or liquid. In some embodiments, the cold temperature thermal store 766 is or includes a multi-phase thermal mass, such as an ice slurry or other phase-change material that uses the latent heat of phase transitions to receive and retain exhaust heat with no associated increase in temperature. In some embodiments, a heat pump actively transfers heat between the cold temperature thermal store 766 and the high temperature thermal store 760.

In some embodiments, the controller 768 receives grid information from the local power grid 770. In some embodiments, the controller 768 is in data communication with a third-party that provides grid information related to the local power grid 770. In some embodiments, the grid information includes grid pricing information, grid load information, grid demand information, grid supply information (such as when the supply of power on the grid is variable, such as due to variable renewable energy sources), or grid source information (such as when the carbon intensity of the energy sources to the grid varies). The controller 768 may determine when to separate electrolyzer feedstock 726 into hydrogen feedstock 728 and oxygen feedstock 730, when to store hydrogen feedstock 728 and/or oxygen feedstock 730, and when to combust hydrogen feedstock 728 and oxygen feedstock 730 in the furnace 706 to produce electricity, based at least partially on the grid information. The controller 768, in some embodiments, determines when to separate electrolyzer feedstock 726 into hydrogen feedstock 728 and oxygen feedstock 730, when to store hydrogen feedstock 728 and/or oxygen feedstock 730, and when to combust hydrogen feedstock 728 and oxygen feedstock 730 in the furnace 706 to produce electricity, based at least partially on reducing costs relative to pricing. The controller 768, in some embodiments, determines when to separate electrolyzer feedstock 726 into hydrogen feedstock 728 and oxygen feedstock 730, when to store hydrogen feedstock 728 and/or oxygen feedstock 730, and when to combust hydrogen feedstock 728 and oxygen feedstock 730 in the furnace 706 to produce electricity, based at least partially on reducing carbon intensity of the system 700.

In some embodiments, the controller 768 receives gas composition data to ensure safe combustion conditions in the furnace and connected pipework. Safe combustion conditions are gas compositions below the lower explosion limit of a gas mixture. In some embodiments, safe combustion conditions are achieved by feedstock dilution with furnace exhaust 738. In some embodiments, safe combustion conditions are achieved by feedstock dilution with an air or inert gas supply, such as during startup and shutdown procedures. In some embodiments, dilution of the hydrogen feedstock 728 and/or oxygen feedstock 730 (or mixed oxygen feedstock 736) is managed by the controller 768. The controller 768 computes required dilutions using gas composition data fed from composition sensors 774. In some embodiments, the composition sensor(s) 774 is configured to measure the gas composition in the hydrogen feedstock line, the oxygen feedstock line, the mixed oxygen feedstock line, the furnace exhaust line, and combinations thereof. The controller 768 activates valves 769 on the hydrogen and oxygen containing feedstock lines to achieve dilution with air or inert gas as required. In some embodiments, dilution with air or inert gas is not expected during normal operation, but only during startup, shutdown or a fault state that threatens to create an explosive gas mixture in the system. During normal operation, dilution of hydrogen and oxygen containing feedstocks is preferred via the furnace exhaust (e.g., exhaust steam 738) to increase heat recovery and system efficiency.

Safe combustion rates and conditions in the furnace 706 are at least partially dependent on pressure in the furnace 706 and of the feedstocks provided to the furnace 706. In some embodiments, the controller 768 receives pressure data from the furnace 706 and/or the feedstock lines to manage combustion conditions in the furnace and connected pipework for a sealed system. In some embodiments, a sealed system has sufficient gas tightness of the furnace 706 and connected pipework to limit atmospheric exchanges below 1% volume of gaseous exhausts. Increasing the combustion feedstocks or peak combustion temperature increases pressure in the furnace. Increasing the rate of condensation (e.g., at the condenser 756) lowers the pressure. The controller 768 receives pressure data from one or more pressure sensors in communication with the furnace 706 and/or the feedstock lines and manages feedstock rates and condensation to achieve a target pressure. In the event of control failure, a pressure release valve 776 prevents dangerous pressure excursions that may damage equipment.

In some embodiments, grid information includes expected grid information, such as expected grid pricing information or expected grid load information, which allows the controller 768 to anticipate and/or prepare for changes in the local power grid 770. In some embodiments, the controller 768 includes or is in data communication with a machine learning model that receives grid information as an input and provides expected grid information as an output, which allows the controller 768 to anticipate and/or prepare for changes in the local power grid 770.

When the system 700 exports electricity to the power grid 770, the system 700, in some embodiments, combusts hydrogen feedstock 728 from the hydrogen buffer 750 and oxygen feedstock 730 from the oxygen buffer 752. When the system 700 requires more feedstock, the local power grid 770 may be unable to supply the input electricity (which may be related to the controller's determination to export electricity). In some embodiments, at least a portion of the electricity produced by the combustion can be stored in a battery 772 in electrical communication with the electrolyzer 724 to provide input electricity during initial heating or during electrolysis.

In some embodiments, the present disclosure relates to systems and methods of oxy-combustion according to any of the sections below:

Clause 1. A method for oxy-combustion, the method comprising: providing an electrolyzer feedstock to at least an electrolyzer cell; separating the electrolyzer feedstock into a hydrogen feedstock and an oxygen feedstock using the at least one electrolyzer cell; combusting a first feedstock derived from the hydrogen feedstock and a second feedstock derived from the oxygen feedstock in a furnace; controlling one or more of a second feedstock composition or a pressure in the furnace; and recycling an exhaust steam from the furnace, wherein at least one portion of exhaust steam from the furnace is recycled in at least one of a steam feedstock and the electrolyzer feedstock.

Clause 2. The method of clause 1, wherein the electrolyzer feedstock includes at least 1% hydrogen gas.

Clause 3. The method of clause 2, wherein the hydrogen gas is received from the hydrogen feedstock.

Clause 4. The method of any preceding clause, wherein a first portion of the exhaust steam is recycled in the steam feedstock and a second portion of the exhaust steam is recycled in the electrolyzer feedstock.

Clause 5. The method of any preceding clause, wherein all of the steam exhaust is recycled into the steam feedstock and the electrolyzer feedstock.

Clause 6. The method of any preceding clause, wherein separating the electrolyzer feedstock into the hydrogen feedstock and the oxygen feedstock includes separating the electrolyzer feedstock at a temperature greater than 300° C.

Clause 7. The method of clause 6, further comprising cooling the oxygen feedstock before combusting the first feedstock with the second feedstock.

Clause 8. The method of clause 6 or 7, further comprising cooling the hydrogen feedstock before combusting first feedstock with the second feedstock.

Clause 9. The method of clause 6, further comprising cooling at least one of the oxygen feedstock and the hydrogen feedstock by transferring thermal energy to a high temperature thermal store.

Clause 10. The method of clause 9, further comprising heating the electrolyzer feedstock with the high temperature thermal store.

Clause 11. The method of any preceding clause, further comprising storing at least a portion of the hydrogen feedstock in a hydrogen buffer for a time duration before combusting the first feedstock derived from the hydrogen feedstock.

Clause 12. The method of clause 11, further comprising storing at least a portion of the oxygen feedstock in an oxygen buffer before combusting the second feedstock derived from the oxygen feedstock.

Clause 13. The method of clause 12, further comprising releasing the oxygen feedstock from the oxygen buffer based at least partially on releasing the hydrogen feedstock from the hydrogen buffer.

Clause 14. The method of clause 12, further comprising releasing the hydrogen feedstock from the hydrogen buffer based at least partially on releasing the oxygen feedstock from the oxygen buffer.

Clause 15. The method of clause 12, further comprising: receiving grid information from a local power grid in electrical communication with the furnace; combusting the first feedstock derived from the hydrogen feedstock from the hydrogen buffer and the second feedstock derived from the oxygen feedstock from the oxygen buffer in the furnace based at least partially on the grid information; generating electricity from combustion; and exporting electricity to the local power grid.

Clause 16. The method of clause 12, further comprising receiving, at a controller, grid information from a local power grid, and wherein the controller instructs the electrolyzer to separate the electrolyzer feedstock into the hydrogen feedstock and the oxygen feedstock at least partially based on the grid information.

Clause 17. The method of clause 12, further comprising receiving, at a controller, grid information from a local power grid, and wherein the controller actuates one or more valves to direct at least one of the hydrogen feedstock from the hydrogen buffer to the furnace and the oxygen feedstock from the oxygen buffer to the furnace at least partially based on the grid information.

Clause 18. The method of any of clauses 15-17, wherein the grid information includes grid pricing information.

Clause 19. The method of any of clauses 15-18, wherein the grid information includes grid load.

Clause 20. The method of any of clauses 15-19, wherein the grid information includes carbon intensity.

Clause 21. The method of any preceding clause, wherein controlling the second feedstock composition includes mixing the oxygen feedstock with a steam feedstock from the exhaust steam to produce the second feedstock at a stoichiometric percentage of no more than 30% oxygen gas in a total composition of the second feedstock.

Clause 22. The method of any preceding clause, wherein the first feedstock is the hydrogen feedstock or the hydrogen feedstock mixed with another component, optionally steam, and/or the second feedstock is the oxygen feedstock or the oxygen feedstock mixed with another component, optionally steam.

Clause 23. The method of any preceding clause, wherein controlling the pressure in the furnace includes setting a combustion pressure below atmospheric pressure, optionally between 760 Torr and $1\times10^{-6}$ Torr, optionally between 100 Torr and 1E-3 Torr.

Clause 24. A system of oxy-combustion, the system comprising: an electrolyzer configured to separate an electrolyzer feedstock into a hydrogen feedstock and an oxygen feedstock; a furnace configured to combust a first feedstock derived from the hydrogen feedstock and a second feedstock derived from the oxygen feedstock; and a splitter configured to separate an exhaust steam from the furnace into at least a first portion and a second portion, wherein the first portion of the exhaust steam from the furnace is recycled in at least one of a steam feedstock and the electrolyzer feedstock.

Clause 25. The system of clause 24, further comprising a hydrogen buffer configured to store and selectively release hydrogen feedstock.

Clause 26. The system of clause 24 or 25, further comprising an oxygen buffer configured to store and selectively release oxygen feedstock.

Clause 27. The system of any of clauses 24-26, further comprising a high temperature thermal store configured to receive heat from the hydrogen feedstock and/or the oxygen feedstock.

Clause 28. The system of any of clauses 24-27, further comprising a water buffer configured to store and selectively release recycled exhaust steam.

Clause 29. The system of any of clauses 24-28, wherein at least a portion of the hydrogen feedstock is diverted back into the electrolyzer feedstock as a reducing hydrogen gas.

Clause 30. The system of any of clauses 24-29, further comprising a mixer configured to mix the oxygen feedstock with a steam feedstock at a stoichiometric percentage of no more than 30% oxygen in a total composition of the second feedstock.

Clause 31. The system of any of clauses 24-30, wherein the first portion of exhaust steam from the furnace is recycled in the steam feedstock and the second portion of the exhaust steam from the furnace is recycled in the electrolyzer feedstock.

Clause 32. The system of any of clauses 24-31, further comprising a controller in data communication with at least the furnace and the electrolyzer, wherein the controller is configured to: receive grid information from a local power grid, and based at least partially on the grid information operate at least one of the electrolyzer, furnace, hydrogen buffer and oxygen buffer.

Clause 33. The system of clause 32, wherein the controller is further configured to compare grid pricing information of the grid information to a threshold value stored on the controller and:
based at least partially on the grid pricing information exceeding the threshold value, releasing the hydrogen feedstock toward the furnace and release the oxygen feedstock toward the furnace to combust the first feedstock and second feedstock in the furnace.

Clause 34. The system of clause 32 or 33, wherein the controller is further configured to compare grid pricing information of the grid information to a threshold value stored on the controller and: based at least partially on the grid pricing information being below a threshold value, separating an electrolyzer feedstock into a hydrogen feedstock and an oxygen feedstock using the electrolyzer.

Clause 35. The system of clause 33, wherein the threshold value is a first threshold value and wherein based at least partially on the grid pricing information being below a second threshold value, separating an electrolyzer feedstock into a hydrogen feedstock and an oxygen feedstock using the electrolyzer.

Clause 36. The system of any of clauses 24-35, wherein a controller is configured to determine a pressure in the furnace and/or feedstock lines and adjust the pressure thereof with one or more valves or the condenser.

Clause 37. The system of any of clauses 24-36, wherein the furnace is configured to combust the first feedstock and the second feedstock at a combustion pressure below atmospheric pressure, optionally between 760 Torr and $1\times10^{-6}$ Torr, optionally between 100 Torr and $1\times10^{-3}$ Torr.

Clause 38. The system of any of clauses 24-37, further comprising a machine learning model configured to receive grid information as an input and output expected grid information to the controller.

Clause 39. The system of clause 38, wherein the furnace is configured to produce electricity and provide electricity to a local power grid.

Clause 40. The system of any of clauses 24-39, further comprising: a splitter configured to separate an exhaust steam from the furnace into at least a first portion and a second portion.

Clause 41. A system of oxy-combustion, the system comprising: an electrolyzer configured to separate an electrolyzer feedstock; a furnace configured to combust a hydrogen feedstock and a mixed oxygen feedstock; a controller configured to receive grid information from a local power grid, wherein the controller includes: a processor, and a hardware storage device in data communication with the processor, the hardware storage device having instructions stored thereon that, when executed by the processor, cause the controller to instruct the system based on the received grid information to: provide the electrolyzer feedstock to the electrolyzer; separate the electrolyzer feedstock into the hydrogen feedstock and the oxygen feedstock, combust a first feedstock derived from the hydrogen feedstock and a second feedstock derived from the oxygen feedstock in the furnace, control one or more of a second feedstock composition or a pressure in the furnace, and recycle an exhaust steam from the furnace, wherein at least one portion of exhaust steam from the furnace is recycled in at least one of a steam feedstock and the electrolyzer feedstock.

Clause 42. The system of clause 41, further comprising a machine learning model configured to receive the grid information as an input and output expected grid information to the controller.

Clause 43. The system of clause 41 or 42, wherein the furnace is configured to produce electricity and provide electricity to the local power grid.

Clause 44. The system of any of clauses 41-43, further comprising: a mixer configured to mix the oxygen feedstock with a steam feedstock to produce the second feedstock.

Clause 45. The system of any of clauses 41-44, further comprising: a splitter configured to separate an exhaust steam from the furnace into at least a first portion and a second portion.

Clause 46. The system of any of clauses 41-45, wherein the controller is configured to determine to separate the electrolyzer feedstock when grid pricing information indicates that grid pricing is below a threshold value.

Clause 47. The system of any of clauses 41-46, wherein the controller is configured to determine to combust the first feedstock and the second feedstock when grid pricing information indicates that grid pricing is above a threshold value.

Clause 48. The system of any of clauses 41-47, wherein the controller is configured to determine to separate the electrolyzer feedstock when carbon intensity information indicates that grid carbon intensity is below a threshold value.

Clause 49. The system of any of clauses 41-48, wherein the controller is configured to determine to combust the first feedstock and the second feedstock when grid carbon intensity information indicates that grid carbon intensity is above a threshold value.

Clause 50. The system of any of clauses 41-49, wherein the furnace is configured to combust the first feedstock and the second feedstock at a combustion pressure below atmospheric pressure, optionally between 760 Torr and $1 \times 10^{-6}$ Torr, optionally between 100 Torr and $1 \times 10^{-3}$ Torr.

Clause 51. The system of any of clauses 41-50, wherein the controller is configured to determine a pressure in the furnace and/or feedstock lines and adjust the pressure thereof with one or more valves or the condenser.

Clause 52. The system of any of clauses 41-51, further comprising a hydrogen buffer configured to store and selectively release hydrogen feedstock.

Clause 53. The system of any of clauses 41-52, further comprising an oxygen buffer configured to store and selectively release oxygen feedstock.

Clause 54. The system of any of clauses 41-53, further comprising a high temperature thermal store configured to receive heat from the hydrogen feedstock and/or the oxygen feedstock.

Clause 55. The system of any of clauses 41-54, further comprising a water buffer configured to store and selectively release recycled exhaust steam.

Clause 56. The system of any of clauses 41-55, wherein at least a portion of the hydrogen feedstock is diverted back into the electrolyzer feedstock as a reducing hydrogen gas.

Clause 57. The system of any of clauses 41-56, further comprising a mixer configured to mix the oxygen feedstock with a steam feedstock at a stoichiometric percentage of no more than 30% oxygen in a total composition of the second feedstock.

Clause 58. The system of any of clauses 41-57, wherein the first portion of exhaust steam from the furnace is recycled in the steam feedstock and the second portion of the exhaust steam from the furnace is recycled in the electrolyzer feedstock.

Clause 59. Any system, device, or method described herein.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A method for oxy-combustion, the method comprising:
providing an electrolyzer feedstock to at least one electrolyzer cell;
separating the electrolyzer feedstock into a hydrogen feedstock and an oxygen feedstock using the at least one electrolyzer cell, wherein separating the electrolyzer feedstock into the hydrogen feedstock and the oxygen feedstock includes separating the electrolyzer feedstock at a temperature greater than 300° C.;
cooling at least one of the oxygen feedstock or the hydrogen feedstock by transferring thermal energy to at least one thermal store;
mixing the oxygen feedstock with a steam feedstock via a mixer to generate a second feedstock upstream from a furnace;
combusting a first feedstock derived from the hydrogen feedstock with the second feedstock in the furnace to generate an exhaust, wherein the exhaust is at least substantially or entirely an exhaust steam;
controlling one or more of a feedstock composition of the second feedstock or a pressure in the furnace;
recycling the exhaust steam from the furnace, wherein at least one portion of the exhaust steam from the furnace is recycled in at least one of the steam feedstock or the electrolyzer feedstock, wherein recycling the exhaust steam comprises splitting the exhaust steam in a splitter into a first steam flow along a first flow path to the mixer and a second steam flow along a second flow path to the at least one electrolyzer cell; and
condensing the exhaust steam to produce water via a condenser, wherein the condenser is disposed along the second flow path downstream of the splitter and upstream of the at least one electrolyzer cell.

2. The method of claim 1, wherein the electrolyzer feedstock includes at least 1% hydrogen gas.

3. The method of claim 2, wherein the hydrogen gas is received from the hydrogen feedstock.

4. The method of claim 1, wherein a first portion of the exhaust steam is recycled in the steam feedstock and a second portion of the exhaust steam is recycled in the electrolyzer feedstock.

5. The method of claim 1, wherein all of the exhaust steam is recycled into the steam feedstock and the electrolyzer feedstock.

6. The method of claim 1, further comprising heating the electrolyzer feedstock with a first thermal store of the at least one thermal store, wherein the first thermal store is configured to store extracted heat from the hydrogen feedstock and/or the oxygen feedstock.

7. The method of claim 1, further comprising storing at least a portion of the hydrogen feedstock in a hydrogen buffer for a time duration before combusting the first feedstock.

8. The method of claim 1, further comprising storing at least a portion of the oxygen feedstock in an oxygen buffer before combusting the second feedstock.

9. The method of claim 8, further comprising storing at least a portion of the hydrogen feedstock in a hydrogen buffer for a time duration before combusting the first feedstock.

10. The method of claim 9, further comprising one of:
releasing the hydrogen feedstock from the hydrogen buffer based at least partially on releasing the oxygen feedstock from the oxygen buffer, and releasing the oxygen feedstock from the oxygen buffer based at least partially on releasing the hydrogen feedstock from the hydrogen buffer.

11. The method of claim 9, further comprising:
receiving grid information from a local power grid in electrical communication with the furnace;
combusting the first feedstock derived from the hydrogen feedstock from the hydrogen buffer with the second feedstock derived from the oxygen feedstock from the oxygen buffer in the furnace based at least partially on the grid information;
generating electricity from combustion; and
exporting electricity to the local power grid.

12. The method of claim 1, comprising heating the water via a boiler, wherein the boiler is disposed along the second flow path downstream of the condenser and upstream of the at least one electrolyzer cell.

13. The method of claim 12, comprising storing the water in a water buffer between the condenser and the boiler along the second flow path.

14. The method of claim 1, wherein the at least one thermal store comprises first and second thermal stores, wherein the first thermal store is configured to store the thermal energy, and the second thermal store comprises one or more cooling components.

15. A method for oxy-combustion, the method comprising:
providing an electrolyzer feedstock to at least one electrolyzer cell;
separating the electrolyzer feedstock into a hydrogen feedstock and an oxygen feedstock using the at least one electrolyzer cell, wherein separating the electrolyzer feedstock into the hydrogen feedstock and the oxygen feedstock includes separating the electrolyzer feedstock at a temperature greater than 300° C.;
mixing the oxygen feedstock with a steam feedstock via a mixer to generate a second feedstock upstream from a furnace;
combusting a first feedstock derived from the hydrogen feedstock with the second feedstock in the furnace to generate an exhaust, wherein the exhaust is at least substantially or entirely an exhaust steam;
recycling the exhaust steam from the furnace, wherein at least one portion of the exhaust steam from the furnace is recycled in at least one of the steam feedstock or the electrolyzer feedstock, wherein recycling the exhaust steam comprises splitting the exhaust steam in a splitter into a first steam flow along a first flow path to the mixer and a second steam flow along a second flow path to the at least one electrolyzer cell; and condensing the exhaust steam to produce water via a condenser, wherein the condenser is disposed along the second flow path downstream of the splitter and upstream of the at least one electrolyzer cell.

16. The method of claim 15, comprising flowing at least a portion of the exhaust steam along a bypass conduit around the condenser to direct the portion of the exhaust steam to the at least one electrolyzer cell.

17. A method for oxy-combustion, the method comprising:

providing an electrolyzer feedstock to at least one electrolyzer cell;

separating the electrolyzer feedstock into a hydrogen feedstock and an oxygen feedstock using the at least one electrolyzer cell, wherein separating the electrolyzer feedstock into the hydrogen feedstock and the oxygen feedstock includes separating the electrolyzer feedstock at a temperature greater than 300° C.;

mixing the oxygen feedstock with a steam feedstock via a mixer to generate a second feedstock upstream from a furnace;

combusting a first feedstock derived from the hydrogen feedstock with the second feedstock in the furnace to generate an exhaust, wherein the exhaust is at least substantially or entirely an exhaust steam;

recycling the exhaust steam from the furnace, wherein at least one portion of the exhaust steam from the furnace is recycled in at least one of the steam feedstock or the electrolyzer feedstock, wherein recycling the exhaust steam comprises splitting the exhaust steam in a splitter into a first steam flow along a first flow path to the mixer and a second steam flow along a second flow path to the at least one electrolyzer cell;

condensing the exhaust steam to produce water via a condenser, wherein the condenser is disposed along the second flow path downstream of the splitter and upstream of the at least one electrolyzer cell; and heating the water via a boiler, wherein the boiler is disposed along the second flow path downstream of the condenser and upstream of the at least one electrolyzer cell.

18. The method of claim 17, comprising flowing at least a portion of the exhaust steam along a bypass conduit around the condenser and the boiler to direct the portion of the exhaust steam to the at least one electrolyzer cell.

19. The method of claim 17, wherein separating the electrolyzer feedstock into the hydrogen feedstock and the oxygen feedstock includes separating the electrolyzer feedstock at a temperature greater than 600° C.

20. The method of claim 17, comprising storing the water in a water buffer between the condenser and the boiler along the second flow path.

* * * * *